United States Patent
Alvarez et al.

(10) Patent No.: US 11,493,914 B2
(45) Date of Patent: Nov. 8, 2022

(54) TECHNOLOGY TO HANDLE AMBIGUITY IN AUTOMATED CONTROL SYSTEMS

(71) Applicant: Intel Corporation, Santa Clara, CA (US)

(72) Inventors: Ignacio Alvarez, Portland, OR (US); Todd Anderson, Hillsboro, OR (US); Vy Vo, Portland, OR (US); Javier Felip Leon, Hillsboro, OR (US); Javier Perez-Ramirez, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 16/913,845

(22) Filed: Jun. 26, 2020

(65) Prior Publication Data

US 2020/0326696 A1   Oct. 15, 2020

(51) Int. Cl.
*G05B 23/02* (2006.01)
*G05B 13/02* (2006.01)

(52) U.S. Cl.
CPC ..... *G05B 23/0281* (2013.01); *G05B 13/0205* (2013.01); *G05B 23/024* (2013.01)

(58) Field of Classification Search
CPC ............ G05B 23/0281; G05B 13/0205; G05B 23/024
See application file for complete search history.

(56) References Cited

U.S. PATENT DOCUMENTS

2014/0363050 A1* 12/2014 Hayakawa ......... G06K 9/00825
                                                              382/103
2018/0197414 A1* 7/2018 Oooka ................. B62D 15/025
(Continued)

FOREIGN PATENT DOCUMENTS

WO   WO-2019093993 A1 * 5/2019 ............... H04Q 9/00

OTHER PUBLICATIONS

Tong et al., "ConvNet and Dempster-Shafer Theory for Object Recognition" 13th international conference on Scalable Uncertainty Management (SUM 2019), Dec. 2019, Compiègne, France, pp. 368-381 (Year: 2019).*

(Continued)

*Primary Examiner* — John C Kuan
(74) *Attorney, Agent, or Firm* — Jordan IP Law, LLC

(57) ABSTRACT

Systems, apparatuses and methods may provide for technology that obtains categorization information and corresponding uncertainty information from a perception subsystem, wherein the categorization information and the corresponding uncertainty information are to be associated with an object in an environment. The technology may also determine whether the corresponding uncertainty information satisfies one or more relevance criteria, and automatically control the perception subsystem to increase an accuracy in one or more subsequent categorizations of the object if the corresponding uncertainty information satisfies the one or more relevance criteria. In one example, determining whether the corresponding uncertainty information satisfies the relevance criteria includes taking a plurality of samples from the categorization information and the corresponding uncertainty information, generating a plurality of actuation plans based on the plurality of samples, and determining a safety deviation across the plurality of actuation plans, wherein the relevance criteria are satisfied if the safety deviation exceeds a threshold.

24 Claims, 8 Drawing Sheets

(56) References Cited

U.S. PATENT DOCUMENTS

| | | | |
|---|---|---|---|
| 2020/0284912 A1* | 9/2020 | Bush | G01S 17/931 |
| 2020/0387717 A1* | 12/2020 | Miyamoto | G06K 9/6271 |
| 2021/0195085 A1* | 6/2021 | Miyake | H04N 5/23219 |

OTHER PUBLICATIONS

E.F. Camacho et al., "Model Predictive Control," (2004), 290 pages.

Y. Gal et al., "Dropout as a Bayesian Approximation: Representing Model Uncertainty in Deep Learning," Proceedings of the 33rd International Conference on Machine Learning, vol. 48, Jun. 2016, 10 pages, <proceedings.mlr.press/v48/gal16.pdf>.

L. Kavraki et al., "Probabilistic Roadmaps for Path Planning in High-Dimensional Configuration Spaces," IEEE Transactions on Robotics and Automation, vol. 12, No. 4, Aug. 1996, pp. 566-580, <cs.cmu.edu/~motionplanning/papers/sbp_papers/PRM/prmbasic_01.pdf>.

S. Kemeny et al., "Multiresolution Image Sensor," IEEE Transactions on Circuits and Systems for Video Technology, vol. 7, No. 4, Aug. 1997, pp. 575-583, <web.archive.org/web/20120417123634id_/http://ericfossum.com/Publications/Papers/Multiresolution%20image%20sensor.pdf>.

G. Litwack, "Chapter 16—Steroid Hormones," in Human Biochemistry, Boston: Academic Press, 2018, 40 pages. (E-Book).

C. A. Lowry et al., "Stress and Arousal/Sleep," Encyclopedia of Behavioral Neuroscience, Academic Press, 2010, 9 pages.

R. Neal, "Bayesian learning for neural networks," Neal, United States, Springer New York, 1995, 195 pages.

M. Nikolaou, "Model Predictive Controllers: A Critical Synthesis of Theory and Industrial Needs," Advances in Chemical Engineering: vol. 26, 2001, 74 pages.

N. Roy et al., "Coastal Navigation with Mobile Robots," Proceedings 1999 IEEE International Conference on Robotics and Automation, vol. 1, May 1999, vol. 1, pp. 1043-1049, <proceedings.neurips.cc/paper/1999/file/df9028fcb6b065e000ffe8a4f03eeb38-Paper.pdf>.

M. Sunnaker et al., "Approximate Bayesian Computation," PLoS computational biology, vol. 9, Jan. 10, 2013, 10 pages, <journals.plos.org/ploscompbiol/article/file?id=10.1371/journal.pcbi.1002803&type=printable>.

K. Wurm et al., "OctoMap: A Probabilistic, Flexible, and Compact 3D Map Representation for Robotics Systems," Proceedings of the ICRA Workshop on Best Practice in 3D, Jan. 1, 2010, 8 pages, <citeseerx.ist.psu.edu/viewdoc/download?doi=10.1.1.176.7242&rep=rep1&type=pdf>.

P. Zappi et al., "Activity Recognition from On-Body Sensors: Accuracy-Power Trade-Off by Dynamic Sensor Selection," Lecture Notes in Computer Science, vol. 4913, Jan. 1970, pp. 17-33, <citeseerx.ist.psu.edu/viewdoc/download?doi=10.1.1.139.5490&rep=rep1&type=pdf>.

* cited by examiner

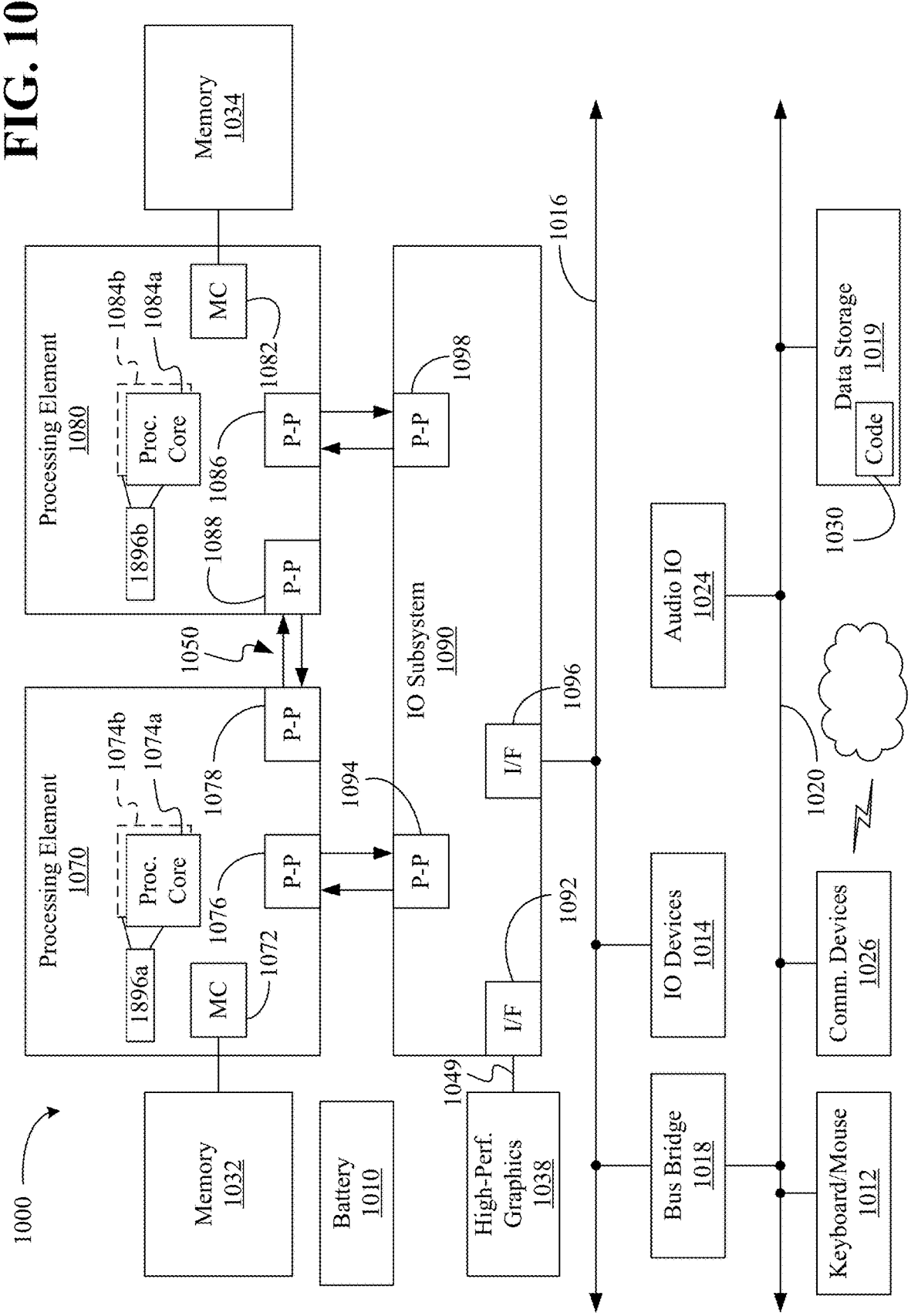

… (1)

TECHNOLOGY TO HANDLE AMBIGUITY IN AUTOMATED CONTROL SYSTEMS

TECHNICAL FIELD

Embodiments generally relate to automated control systems. More particularly, embodiments relate to technology that handles ambiguity in automated control systems.

BACKGROUND

Automated control systems may be used in a variety of environments such as, for example, autonomous vehicle environments. In automated control systems, there are typically three main phases that are run repeatedly in a loop so that the system may understand what is occurring in the environment (e.g., perception), make plans to achieve a specified goal within the environment (e.g., planning), and then execute those plans (e.g., actuation). In the perception phase, some characteristics of the real-world environment are perceived through a variety of sensors, where the raw sensor data is aggregated and used to identify and categorize actors and objects within the environment. Particularly when deployed in uncontrolled or unpredictable environments, perception systems are imperfect and the best guess at the categorization of certain objects may be incorrect on occasion. Conventional planning systems may either ignore the uncertainty of categorizations (e.g., leading to safety concerns) or attempt to substitute safe object types for suspected false categorizations (e.g., resulting in reduced productivity, increased processing overhead and/or increased power consumption).

BRIEF DESCRIPTION OF THE DRAWINGS

The various advantages of the embodiments will become apparent to one skilled in the art by reading the following specification and appended claims, and by referencing the following drawings, in which:

FIG. 10 is a block diagram of an example of a multi-processor based computing system according to an embodiment.

DESCRIPTION OF EMBODIMENTS

In general, embodiments provide for an augmented perception system that gives more information about the various possible categorizations of environmental objects and the certainty associated with each (e.g., Feature #1). Embodiments also provide for an augmented perception system that outputs an overall uncertainty level (e.g., Feature #2). Additionally, embodiments include technology that reacts to these uncertainty levels by taking any number of actions to potentially increase the accuracy and/or reduce the uncertainty (e.g., Feature #3). Moreover, embodiments provide for a planning mechanism to intelligently sample from the possible categorizations in the environmental model, apply planning on each, and select the safest plan (e.g., Feature #4). Embodiments also provide for uncertainty monitoring technology to differentiate meaningful ambiguity from irrelevant ambiguity (e.g., Feature #5). Additionally, embodiments generally include uncertainty feedback technology by which the perception subsystem is instructed to dampen uncertainty measurements for certain objects (e.g., Feature #6).

More particularly, embodiments augment perception subsystems (e.g., sensors and/or cameras with associated software having object detection and recognition/categorization capabilities) to not only return the most likely categorization of each environmental object but a categorical probability distribution (e.g., multiple categories each with an associated probability). In one example, a perception subsystem "f" that processes input data "x", outputs a set of "i" categorical distributions $C_i$ over the universe of known objects $o \in \Omega$.

$$f(x) \rightarrow \{C_i\} \text{ s.t. } \Sigma_{o \in \Omega} C_i(o) = 1$$

Figure 1:
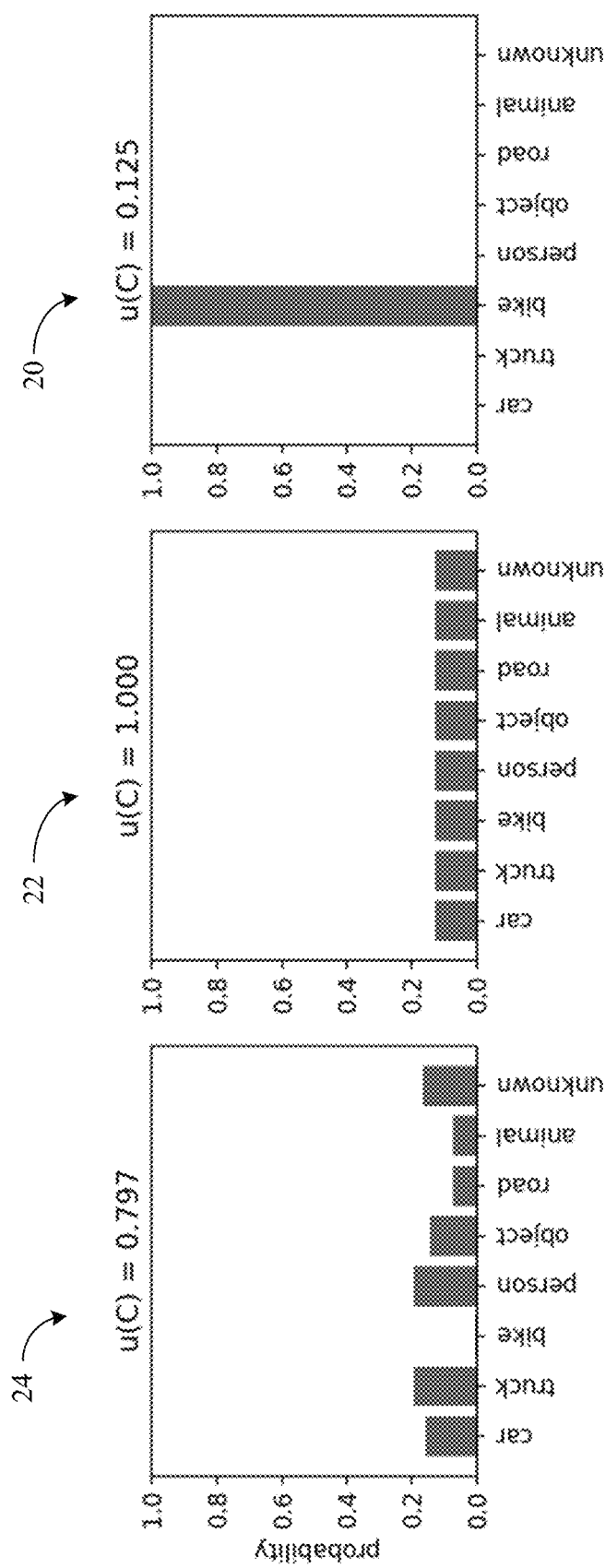
FIG. 1 is a set of charts of an example of uncertainty computations for different categorical distributions according to an embodiment.

For example, in deep learning-based perception systems, Bayesian Neural Networks may be used to obtain such categorical distributions. The distribution of the probability values for each object detected by the perception system contains information about the associated uncertainty (e.g., ambiguity). An example of an uncertainty quantification is shown in FIG. 1, where the following discrepancy metric is used to quantify the classification uncertainty:

$$u_i(C_i) = 1/|\Omega| \Sigma_{o \in \Omega} C_i(o)^2$$

In the illustrated example, a first uncertainty chart 20 is shown in which a categorical distribution has a minimum uncertainty (e.g., an automated perception subsystem has maximum confidence that a detected object is a bike). By contrast, a second uncertainty chart 22 might correspond to a categorical distribution that has a maximum uncertainty (e.g., the automated perception subsystem determines that all categories are equally likely). A third uncertainty chart 24 demonstrates a categorical distribution having an intermediate uncertainty. As will be discussed in greater detail, the ability to obtain multiple candidate categorizations and corresponding uncertainties may enhance performance and/or reduce power consumption. Additionally, the overall uncertainty value may be advantageous in terms of performance and/or power consumption.

In one example, the perception subsystem outputs (e.g., Feature #2) an overall uncertainty metric for the entire returned environmental model. Such overall uncertainty is computed based on the individual uncertainty values $u_i(c_i)$. The approach to combining individual uncertainties, however, into an aggregated overall uncertainty value typically depends on the application. For example, a conservative approach may consider the maximum uncertainty value as the overall uncertainty. In another example, more sophisticated attention mechanisms might be used to weigh the importance of uncertain object classifications. Objects that do not play a role in the task might be not relevant for the performance and uncertainty in the classification of those objects would not impact the system behavior.

An alternate embodiment of Feature #2 would be to introduce a separate component from the perception subsystem that takes the augmented environmental model and calculates the uncertainty metric from the model using Approximate Bayesian Inference. In this case, a generative model component $G(C_1) \rightarrow \hat{x}_i$ and a likelihood function $L(x, \hat{x}) \rightarrow \{0,1\}$ may be used. In such a case, the generative model component acts as an inverse perception model that may generate synthetic data points in the sensor input space by using the outputs of the augmented perception model (e.g., predicted scene objects categorical distributions $C_i$). Sensor data may be generated from the categorical representation using simulators, regression models or generative neural networks (e.g., generative adversarial network/GAN, energy based model/EBM, etc.).

For example, a realistic game engine might be used to simulate cameras, assuming that the models of the objects are available. In one embodiment, the likelihood model is used to compare to what extent the generated sensor data $\hat{x}$ resembles the perceived sensor data x. For such an implementation, a probability density function (e.g., Multivariate Normal, Gamma) or any other kernel (e.g. Epanechnikov, tricube, normal) may be used by setting the first moment (e.g., location) and obtaining the second moment (e.g., scale) from the uncertainty of each C. These components enable the application of importance sampling or Monte Carlo Markov Chain sampling algorithms that will generate samples from the posterior distribution p(C|x). The variance of the obtained sample set conveys information about the joint predictive posterior uncertainty, which is a direct input to Feature #3, the component that handles the effect of uncertainty to the system.

Effects of Uncertainty Level

In an embodiment, the uncertainty value functions analogously to cortisol levels in the human brain. For example, with mild increases in cortisol, senses may be heightened. A corollary in the technology described herein may be for higher uncertainty levels to increase the frequency of the robotic control cycle (e.g., Feature #3). While some systems (e.g., autonomous driving) that are not energy or power constrained may operate at maximum frequency continually, other systems on the "edge" that are energy or power constrained may benefit from such an approach. If there is uncertainty, more classifications are performed to potentially increase the accuracy and return the system back to a point where there is confidence that negative outcomes may be avoided. Additionally, some sensors in the device may not be used continually or may not be used to their full capacity by default, again potentially due to power or energy constraints.

In one example, increased uncertainty levels trigger the relevant sensors to turn on and/or function at an increased resolution (e.g., Feature #3) in an attempt to reduce the observed environmental uncertainty. Some sensors may also be able to focus increased resolution at only certain parts of the environment. Those parts identified as uncertain might receive additional sensor focus. One potential way to achieve additional sensor focus is to use multiple perception passes with different sensor resolution levels defining regions of interest at each level. To compensate for the increased power demand, the system may turn off or slow down the control cycle for less critical systems (e.g., analogous to the effects of cortisol on metabolism and immune responses).

Planning Given Uncertainty

Several possible embodiments of planning in the presence of augmented environmental models and uncertainty levels are possible. First, the planning phase could use the aggregate uncertainty level and the individual uncertainty levels in the environmental model directly. If, for example, planning is implemented using a neural network, then training data might include both aggregate and individual uncertainty levels with the associated actuation plan corresponding to safer actions as the uncertainty levels rise.

Another embodiment of planning in the presence of uncertainty would be for planning to take place via sampling (e.g., Feature #4). Such an approach has the benefit that the core planning subsystem may be agnostic to uncertainties and that the handling of uncertainties may be isolated to a wrapper around that core planning. For example, the environmental model returned by the perception stage might include some uncertainty for various objects. If N objects have some associated uncertainty then the total number of possible interpretations of the environmental model would be $\Pi^N$, $O_i$ where $O_i$ is the number of possible categorizations of object i. Meta-planning would then sample from this space (e.g., potentially according to time, computational resources or power constraints), creating definitive environmental models that can be passed through the core planner. Meta-planning then examines the plan created for each sampled environmental model. If the plans are all effectively identical, then the ambiguity in the perception may be said to be irrelevant (e.g., Feature #5). If the plans differ, however, then the ambiguity in the perception is meaningful. In this case, the potential plans may be fed through a new component that identifies the safest plan, which is the plan that would be acted upon. In some implementations, differences are measured based on the resulting planning vectors (e.g., trajectories) by calculating distance within the sampled space using Euclidean distance or Mahalanobis distance in multidimensional space. In other implementations, this metric may be a scalar resulting from the distance between two absolute values.

Uncertainty Monitor

Figure 2:
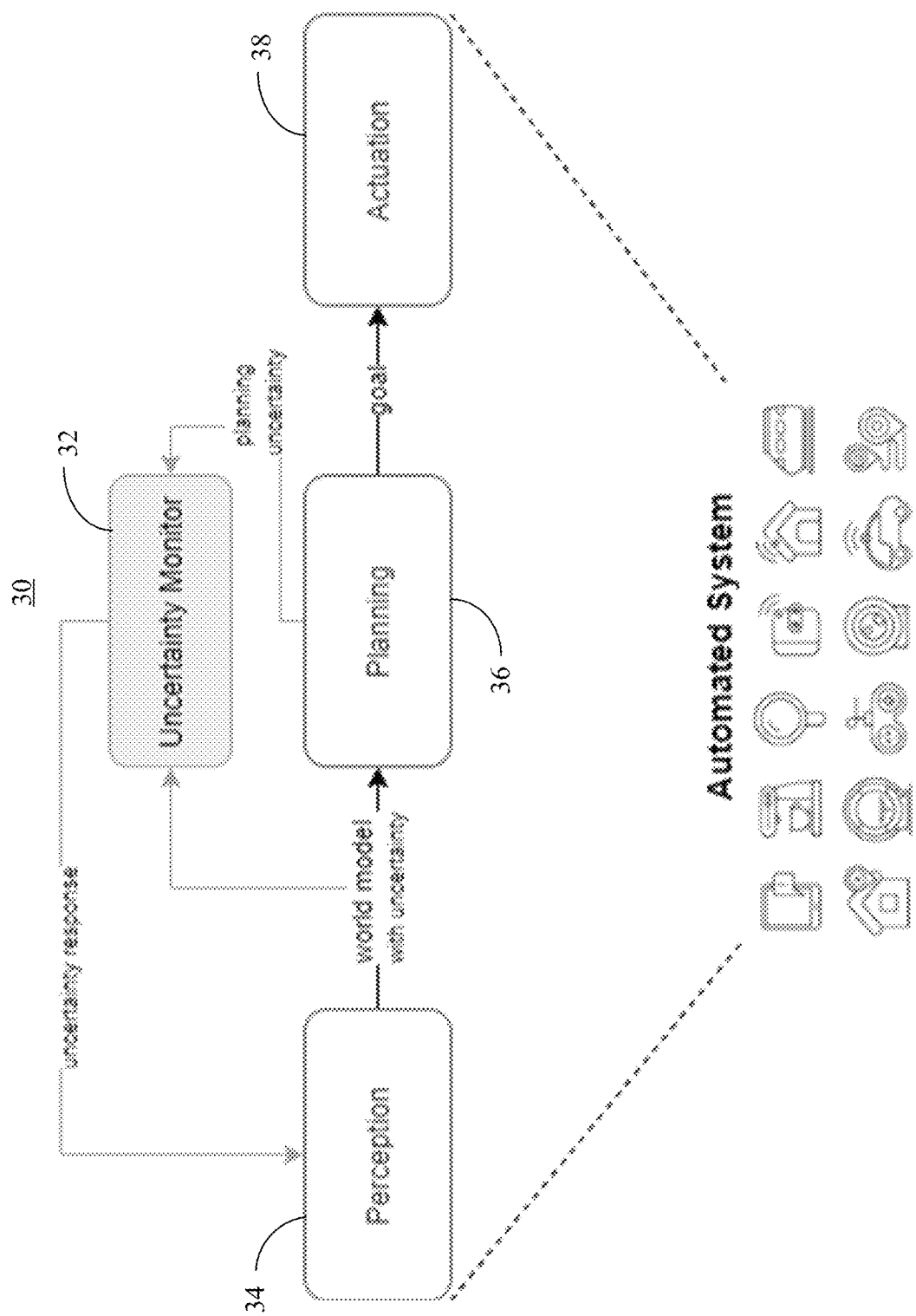
FIG. 2 is a block diagram of an example of an automated control system according to an embodiment.

FIG. 2 demonstrates that an automated control system 30 may include an uncertainty monitor 32 (e.g., including logic instructions, configurable logic, fixed-functionality hardware logic, etc., or any combination thereof) in addition to a perception subsystem 34 (e.g., stage), a planning subsystem 36, and an actuation subsystem 38. The illustrated uncertainty monitor 32 is able to correlate the uncertainty in the environmental models output by the perception subsystem 34 with what the planning subsystem 36 has discovered about the meaningfulness or irrelevance of those uncertain parts of the environmental models based on the above mentioned distance. Thus, the uncertainty monitor 32 may determine that all of the current ambiguities are not relevant for the execution of the current plan. In such a case, the uncertainty monitor 32 may send feedback (e.g., uncertainty response) to the perception subsystem 34 to dampen or suppress the uncertainty measures for a given set of objects. As a result, the overall uncertainty level may decrease, which in turn would undo the increased frequency or sensor improvements as described in the Effects of Uncertainty Level section above. Moreover, for power-constrained devices, such a solution enables the device to return to a lower power consumption mode. The subsequent higher confidence levels to the planning subsystem 36 could decrease the number of samples required of the potential environmental space, further reducing energy consumption.

Additionally, uncertainties that are irrelevant for certain goals may be meaningful as goals change, and vice versa.

Thus, the planning subsystem 36 may notify the uncertainty monitor 32 as goals change so that the uncertainty monitor 32 may discontinue suppressing the perception subsystem 34 from exposing the true uncertainty in the environmental model output of the perception subsystem 34.

Figure 3:
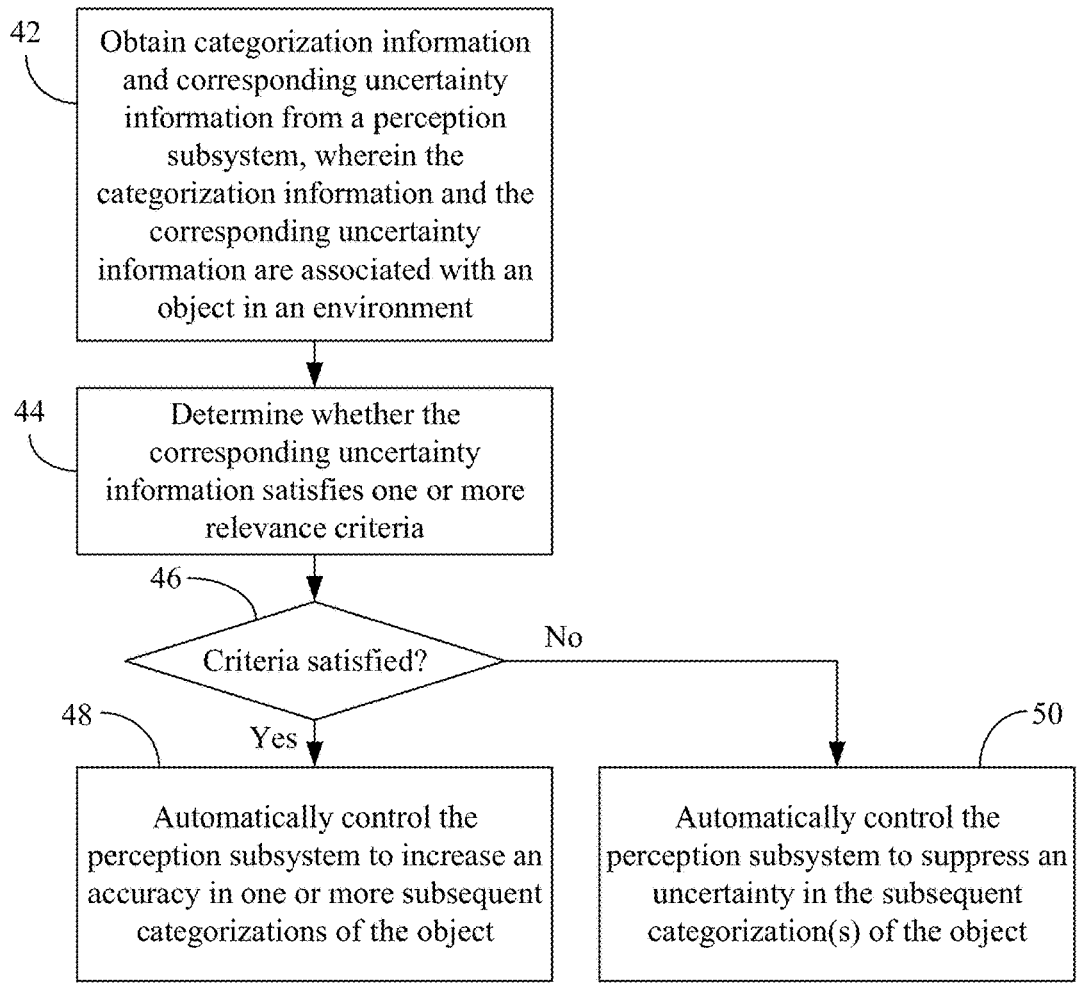
FIG. 3 is a flowchart of an example of a method of operating a performance-enhanced automated control system according to an embodiment.

FIG. 3 shows a method 40 of operating a performance-enhanced automated control system. The method 40 may generally be implemented in an uncertainty monitor such as, for example, the uncertainty monitor 32 (FIG. 2), already discussed. More particularly, the method 40 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 40 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 42 provides for obtaining categorization information and corresponding uncertainty information from a perception subsystem, wherein the categorization information and the corresponding uncertainty information are associated with an object in an environment (e.g., co-mingled recycling environment, industrial robot environment, autonomous vehicle environment, etc.). For example, the categorization information might include a first candidate category (e.g., truck in an autonomous vehicle environment) of the object, a second candidate category (e.g., car in an autonomous vehicle environment) of the object, and so forth. Additionally, the corresponding uncertainty information may include a first uncertainty value (e.g., 0.2) corresponding to the first candidate category, a second uncertainty value (e.g., 0.18) corresponding the second candidate category, etc., as well as an overall uncertainty value (e.g., maximum value, weighted sum). While two candidate categories and corresponding uncertainties are described to facilitate discussion, any number of candidate categories and corresponding uncertainties may be used depending on the circumstances.

Block 44 determines whether the corresponding uncertainty information satisfies one or more relevance (e.g., meaningfulness) criteria. If it is determined at block 46 that the relevance criteria are satisfied (e.g., the uncertainty is meaningful), illustrated block 48 automatically controls the perception subsystem to increase an accuracy in one or more subsequent categorizations of the object. In an embodiment, block 48 includes increasing the frequency of the control loop in the automated control system, increasing the resolution of a sensor in the perception subsystem, etc., or any combination thereof, wherein the sensor is associated with the subsequent categorization(s). Increasing the accuracy as shown may reduce uncertainty, enhance performance and/or improve safety.

If it is determined at block 46 that the relevance criteria are not satisfied (e.g., the uncertainty is not meaningful), block 50 may automatically control the perception subsystem to suppress (e.g., disregard, dampen) an uncertainty in the one or more subsequent categorizations of the object. In one example, block 50 includes decreasing the frequency of the control loop in the automated control system, decreasing the resolution of a sensor in the perception subsystem, etc., or any combination thereof, wherein the sensor is associated with the subsequent categorization(s). Suppressing the uncertainty as shown may reduce power consumption. As already noted, the suppression of uncertainty in block 50 and/or the reduction of uncertainty in block 48 may be discontinued in response to a change in the goals and/or objectives of the automated control system.

Figure 4:
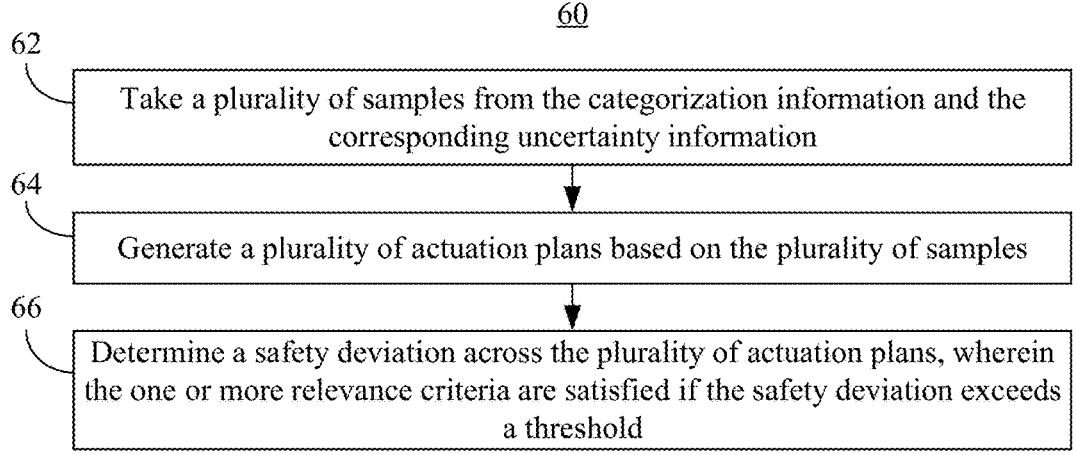
FIG. 4 is a flowchart of an example of a method of determining whether uncertainty information satisfies one or more relevance criteria.

FIG. 4 shows a method 60 of determining whether corresponding uncertainty information satisfies one or more relevance criteria. The method 60 may generally be incorporated into block 44 and/or block 46 (FIG. 3), already discussed. More particularly, the method 60 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 62 provides for taking a plurality of samples from the categorization information and the corresponding uncertainty information, where a plurality of actuation plans may be generated at block 64 based on the plurality of samples. For example, block 62 might select a first candidate category and a first uncertainty value/level (e.g., truck having a 0.2 uncertainty level) from the output of the perception subsystem and block 64 may generate a first actuation plan (e.g., first lane change decision) based on the first candidate category and corresponding uncertainty value. Similarly, block 62 may select a second candidate category and a second uncertainty value/level (e.g., car having a 0.18 uncertainty level) from the output of the perception subsystem, with block 64 generating a second actuation plan (e.g., second lane change decision) based on the second candidate category and corresponding uncertainty value. As already noted, while two candidate categories and corresponding uncertainty values/levels are described to facilitate discussion, any number of candidate categories and corresponding uncertainty values/levels may be used depending on the circumstances.

Block 66 may determine a safety deviation across the plurality of actuation plans, wherein the one or more relevance criteria are satisfied if the safety deviation exceeds a threshold. Thus, if the first lane change decision is significantly safer than the second lane change decision (or vice versa), then the perception subsystem may be instructed to reduce uncertainty in subsequent categorizations of the object. By contrast, if the first lane change decision and the second lane change decision are relatively similar in terms of safety, the perception subsystem might be instructed to suppress an uncertainty in the subsequent categorizations of the object. The illustrated method 60 therefore further enhances performance, improves safety and/or reduces power consumption by sampling from the categorization and uncertainty information.

Example Use Case—Sorting Co-Mingled Recycling Objects

In this use case, a recycling facility processes co-mingled recycling materials and is responsible for sorting the materials into the various kinds of recyclable categories (e.g., ferrous metals, aluminum, plastics, paper, cardboard, newsprint, glass, as well as non-recyclable materials mistakenly placed into a recycling bin). In an embodiment, much of the human sorting is offloaded to robots. In one example, co-mingled recycling is transferred onto a conveyor belt that runs past a series of robotic arms and cameras (e.g., either on the robotic arms, statically mounted, or both) that are responsible for visually sensing the conveyor belt and determining the kind of material that each object on the conveyor belt is made of, grabbing each object, and moving the objects to separate areas/bins where all the objects are of the same type. All of the devices may operate as one automated control system rather than independently. The physical environment may be somewhat unpredictable in terms of the kinds of objects that will appear but may be very unpredictable in terms of the arrangement of objects on the conveyor belt. Two goals may be simultaneously managed: 1) the most objects sorted as possible in the least amount of time and 2) the number of mis-categorizations is minimized.

In this scenario, the collection of cameras is the perception subsystem, which is sensing and classifying objects as to one of the materials noted above. The perception subsystem outputs the possible classifications of each object along with an uncertainty metric for each (e.g., Feature #1) along with an overall uncertainty metric (e.g., Feature #2). If uncertainty is high then the system could slow down the conveyor, allowing the static cameras more viewpoints on the uncertain objects (e.g., Feature #3). Similarly, the planning subsystem, with the goal of increasing accuracy (e.g., reducing uncertainty), may instruct any robotic arms with an attached camera to move to get a different viewing angle on an object or the planning subsystem may instruct one of the robotic arms to uncover or reposition objects on the conveyor so that the perception system would have a more ideal viewpoint in order to classify the object with greater certainty (e.g., Feature #4).

The uncertainty monitor may make the determination that a classification between different kinds of plastics or different kinds of paper represents a somewhat irrelevant ambiguity (e.g., Feature #5) and therefore instruct the perception subsystem to not place a high priority on increasing the certainty of the classifications of those objects. If it becomes clear that the classification of an uncertain object cannot be improved by additional time or actions, then the uncertainty monitor may instruct the perception subsystem to classify the object as unknown (e.g., very likely unrecyclable) with high certainty so that it does not affect the overall uncertainty measure (e.g., Feature #6).

Example Use Case—Robots in an Industrial Warehouse

Another example may involve an industrial warehouse where control loops in robots are virtualized and run at an edge/cloud server. Robots could range from automated guided vehicles (AGVs) to robotic arms manipulating objects. In an embodiment, robots are connected to the infrastructure through a Wi-Fi interface. Unlike in Ethernet networks, the capacity of the communication channel in a Wi-Fi interface may not be deterministic (e.g., the capacity is stochastic). To guarantee the wireless packet delivery rate of robot sensing and actuation data flows to run the control loops, a statistical model of the channel behavior may be used. In this case, the quantities that are sensed are values/signals such as channel capacity and availability. This uncertainty may be sensed and calculated by collecting information from the Wi-Fi devices within the system (e.g., Features #1 and #2). Any individual uncertainties or the aggregative uncertainty may then be used to tune the control loops (e.g., decrease the control cycle frequency, Feature #3) to ensure the correct operation of robots in the warehouse. In addition, if the channel capacity decreases because of the presence of interference, Wi-Fi client radios, which typically operate in power savings mode (e.g., radio wakes up only when scheduled for transmissions), may be used to both send and receive data and while not being used for communications, monitor the channel to detect and localize interference sources in the environment (e.g., Features #3 and #4).

Example Use Case—Autonomous Vehicle

Figure 5:
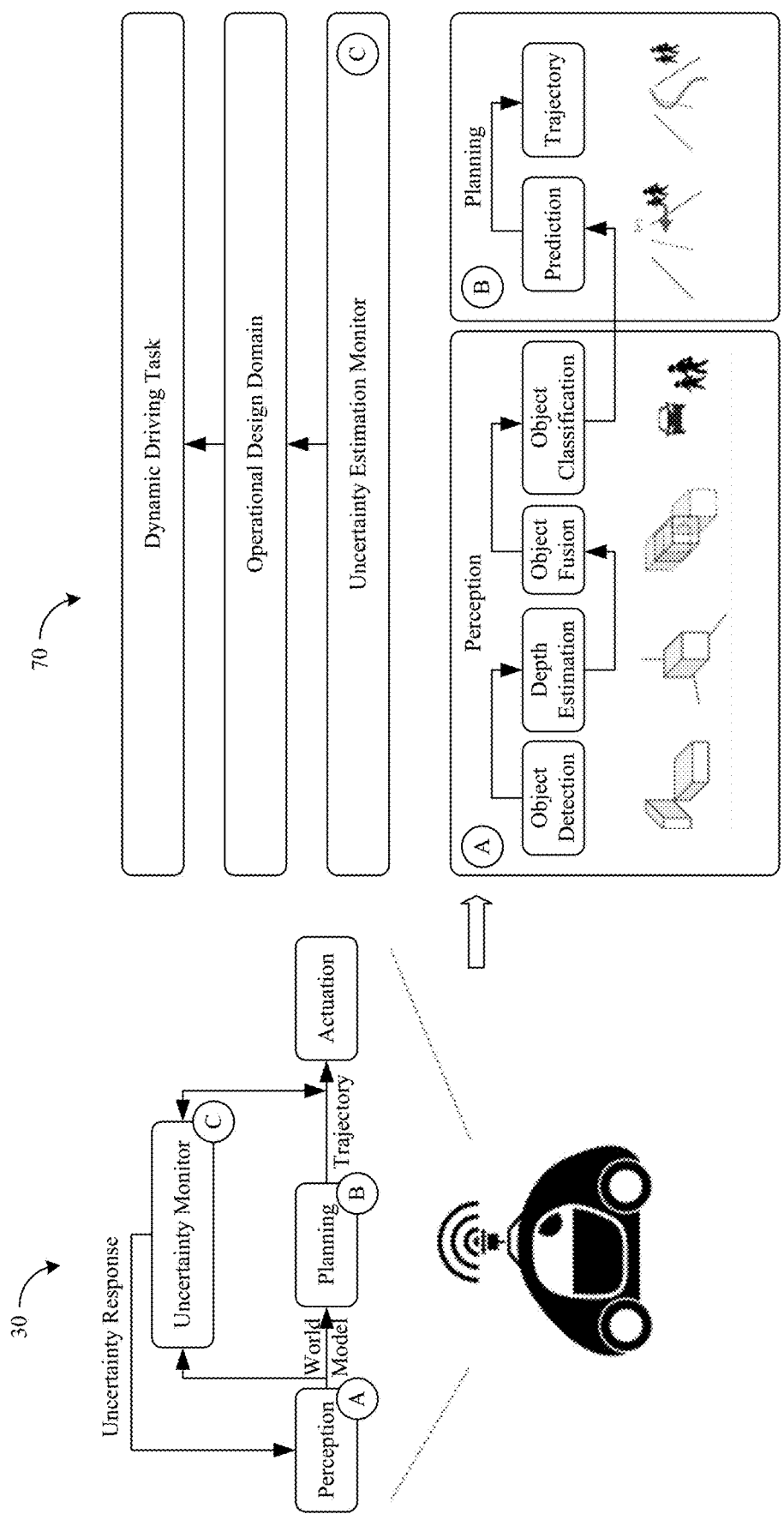
FIG. 5 is a block diagram of an example of a mapping of an automated control system to an automated driving use case according to an embodiment.

In another embodiment, the uncertainty monitor is applied to an automated driving use case. In this case, the uncertainty monitor (e.g., Feature #4) provides input to an operational design domain monitoring system that expands across the perception subsystem (e.g., Feature #1) and planning subsystem (e.g., Feature #4) and whose function is to determine if the automated driving system is able to correctly perform the dynamic driving task (e.g., Feature #5). An example mapping of the automated control system 30 to an automated driving architecture 70 is shown in FIG. 5.

In this case, a particular challenge is how to determine which perception uncertainties have an impact on the driving task (e.g., Feature #5). Multiple components in the perception subsystem may be affected by the uncertainties described above. Only some of these uncertainties, however, will have an impact on the planning output, the trajectory and subsequent mapping to steering/break commands.

Figure 6:
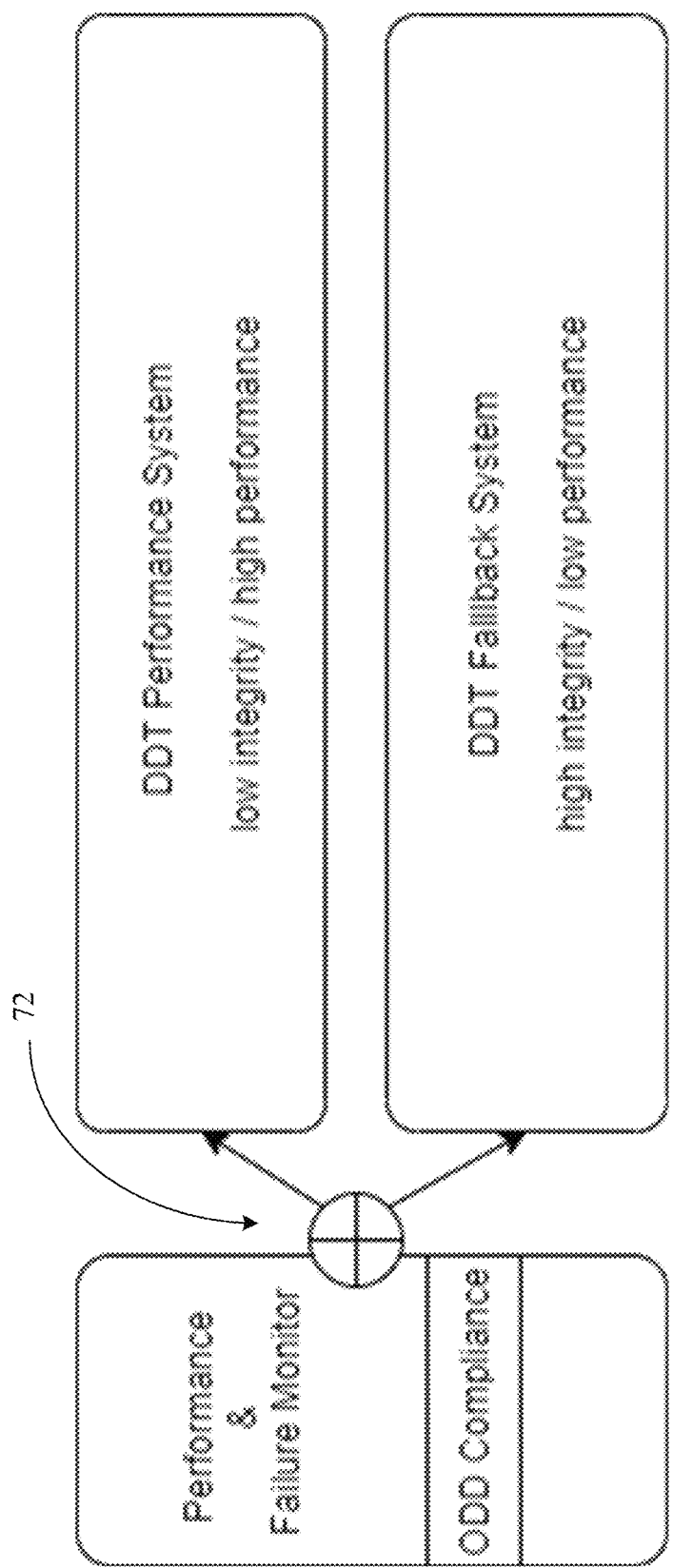
FIG. 6 is a block diagram of an example of performance switching in an operational design domain (ODD) according to an embodiment.

As shown in FIG. 6, the uncertainty estimation monitor provides an estimation of the potential exit of the current operational design domain (ODD), which might trigger a change 72 in the dynamic driving task (DDT) for a minimal risk condition (e.g., emergency break maneuver or a failure mitigation strategy). The compliance to the ODD state facilitates the switch of logical components for fail operational mode (e.g., Feature #6).

As described with respect to the augmented perception subsystem, the impact of uncertainty estimations in the automated driving system may be monitored and coupled with the ODD monitor system that receives the output of the planning subsystem. Depending on the specification of the ODD, multiple uncertainty thresholds may be taken into account for DDT correction mechanisms (e.g., Feature #6). While the most critical threshold will trigger the fallback system, other responses within the ODD may also be triggered by the ODD monitoring and corresponding safety submodules overseeing the planning. These responses may include a reduction of speed or modifications to trajectory as a result of more conservative safety envelope calculations derived from uncertainty estimations on perception. In the automated driving ODD monitor described herein, Remaining Error Rate (RER) and Remaining Accuracy Rate (RAR) are used as thresholds for an out of ODD determination. These thresholds may be defined as:

$$RER = \frac{CF}{N}, \quad RAR = \frac{CT}{N}$$

In other terms, RER may be considered the ratio of the number of certain but incorrect samples (Certain False/CF) to all samples and RAR may be considered the ratio of the number of certain and correct samples (Certain True/CT) to all samples.

Figure 7:
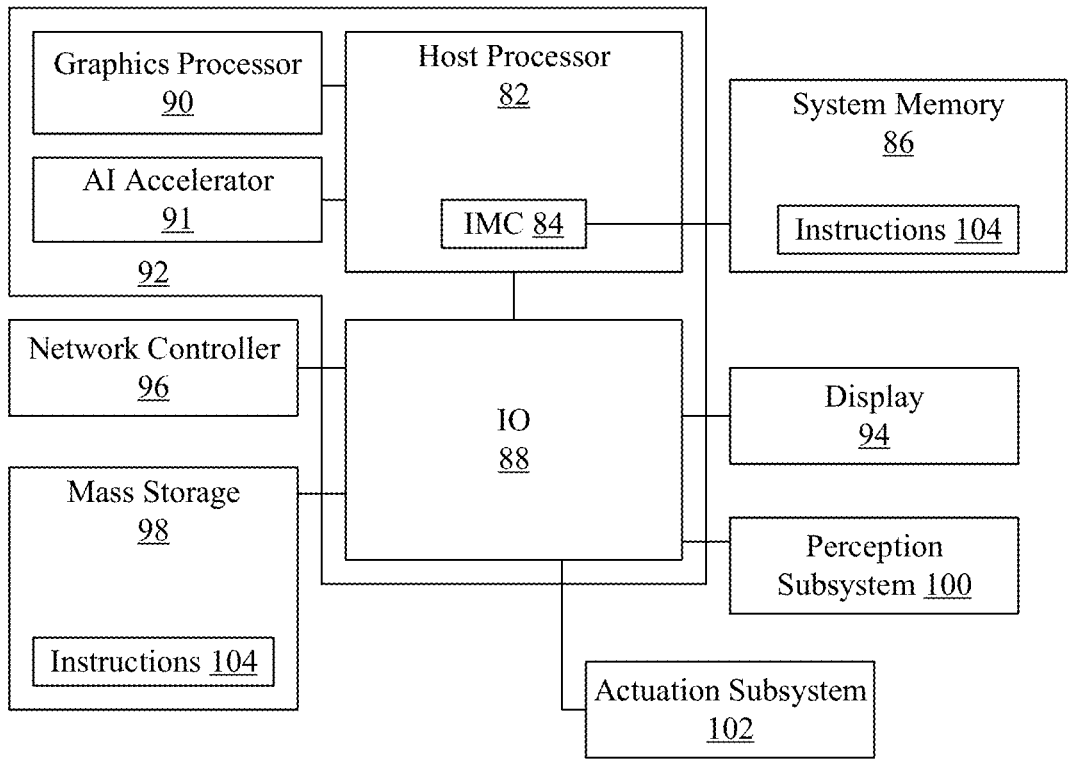
FIG. 7 is a block diagram of an example of a performance-enhanced computing system according to an embodiment.

Turning now to FIG. 7, a performance-enhanced computing system 80 (e.g., automated control system) is shown. The system 80 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 80 includes a host processor 82 (e.g., central processing unit/CPU) having an integrated memory controller (IMC) 84 that is coupled to a system memory 86.

The illustrated system 80 also includes an input output (TO) module 88 implemented together with the host processor 82, an AI accelerator 91 and a graphics processor 90 (e.g., graphics processing unit/GPU) on a semiconductor die 92 as a system on chip (SoC). In an embodiment, the semiconductor die 92 also includes a vision processing unit (VPU, not shown). The illustrated TO module 88 communicates with, for example, a display 94 (e.g., touch screen, liquid crystal display/LCD, light emitting diode/LED display), a network controller 96 (e.g., wired and/or wireless), and mass storage 98 (e.g., hard disk drive/HDD, optical disk, solid state drive/SSD, flash memory). The illustrated computing system 80 also includes a perception subsystem 100 (e.g., including one or more sensors and/or cameras) and an actuation subsystem 102.

In an embodiment, the host processor 82, the graphics processor 90, the AI accelerator 91, the VPU and/or the TO module 88 execute instructions 104 retrieved from the system memory 86 and/or the mass storage 98 to perform one or more aspects of the method 40 (FIG. 3) and/or the method 60 (FIG. 4), already discussed. Thus, execution of the illustrated instructions 104 may cause the die 92 to obtain categorization information and corresponding uncertainty information from the perception subsystem 100, wherein the categorization information and the corresponding uncertainty information are to be associated with an object in an environment. In an embodiment, the environment is one or more of a co-mingled recycling environment, an industrial robot environment or an autonomous vehicle environment. Execution of the instructions 104 may also cause the die 92 to determine whether the corresponding uncertainty information satisfies one or more relevance criteria and automatically control the perception subsystem 100 to increase an accuracy in one or more subsequent categorizations of the object if the corresponding uncertainty information satisfies the one or more relevance criteria. The system 80 is therefore considered to be performance-enhanced at least to the extent that relevance criteria are used to improve accuracy in the subsequent categorization(s).

Figure 8:
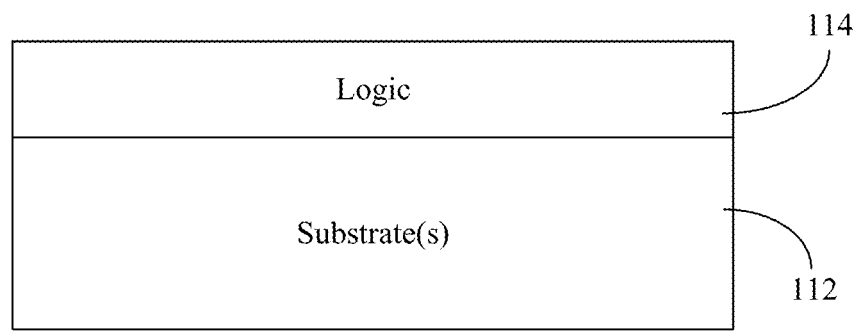
FIG. 8 is an illustration of an example of a semiconductor apparatus according to an embodiment.

FIG. 8 shows a semiconductor package apparatus 110. The illustrated apparatus 110 includes one or more substrates 112 (e.g., silicon, sapphire, gallium arsenide) and logic 114 (e.g., transistor array and other integrated circuit/IC components) coupled to the substrate(s) 112. The logic 114 may be implemented at least partly in configurable logic or fixed-functionality logic hardware. Thus, the logic 114 might include a host processor, a graphics processor, an AI accelerator, a VPU, an 10 module, etc., or any combination thereof. In one example, the logic 114 implements one or more aspects of the method 40 (FIG. 3) and/or the method 60 (FIG. 4), already discussed. Thus, the logic 114 may obtain categorization information and corresponding uncertainty information from a perception subsystem, wherein the categorization information and the corresponding uncertainty information are to be associated with an object in an environment. The logic 114 may also determine whether the corresponding uncertainty information satisfies one or more relevance criteria and automatically control the perception subsystem to increase an accuracy in one or more subsequent categorizations of the object if the corresponding uncertainty information satisfies the one or more relevance criteria. The apparatus 110 is therefore considered to be performance-enhanced at least to the extent that relevance criteria are used to increase accuracy in the subsequent categorization(s).

In one example, the logic 114 includes transistor channel regions that are positioned (e.g., embedded) within the substrate(s) 112. Thus, the interface between the logic 114 and the substrate(s) 112 may not be an abrupt junction. The logic 114 may also be considered to include an epitaxial layer that is grown on an initial wafer of the substrate(s) 112.

Figure 9:
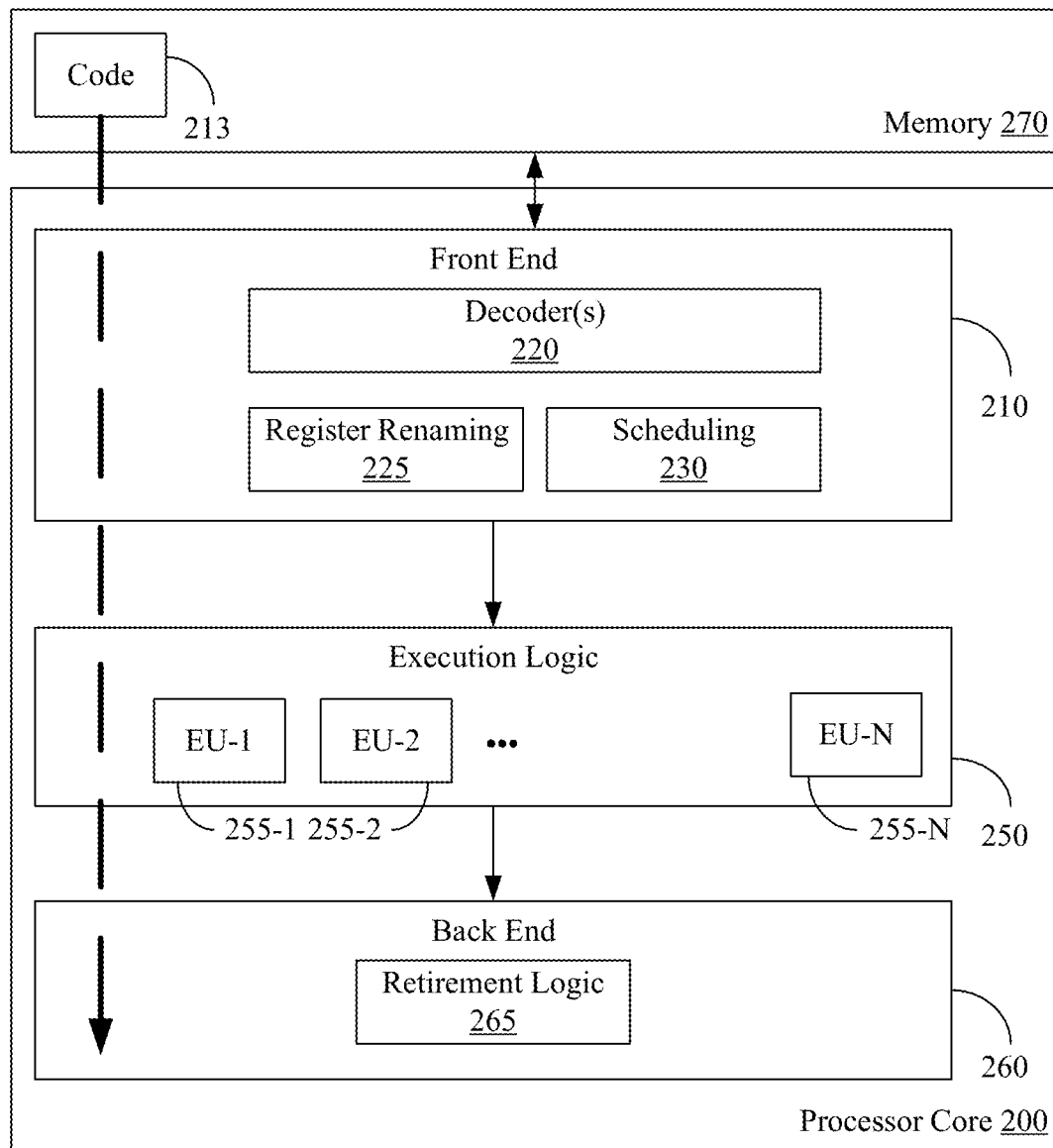
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 40 (FIG. 3) and/or the method 60 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 40 (FIG. 3) and/or the method 60 (FIG. 4), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 includes a performance-enhanced automated control system comprising a first subsystem, a second subsystem, a processor coupled to the first subsystem and the second subsystem, and a memory coupled to the processor, the memory including a set of executable program instructions, which when executed by the processor, cause the processor to obtain categorization information and corresponding uncertainty information from the second subsystem, wherein the categorization information and the corresponding uncertainty information are to be associated with an object in an environment, determine whether the corresponding uncertainty information satisfies one or more relevance criteria, and automatically control the second subsystem to increase an accuracy in one or more subsequent categorizations of the object if the corresponding uncertainty information satisfies the one or more relevance criteria.

Example 2 includes the system of Example 1, wherein to automatically control the second subsystem to increase the accuracy in the one or more subsequent categorizations, the instructions, when executed, cause the automated control system to one or more of increase a frequency of a control loop in the automated control system or increase a resolution of a sensor in the second subsystem, and wherein the sensor is to be associated with the one or more subsequent categorizations.

Example 3 includes the system of Example 1, wherein the instructions, when executed, further cause the automated control system to automatically control the second subsystem to suppress an uncertainty in the one or more subsequent categorizations if the corresponding uncertainty information does not satisfy the one or more relevance criteria.

Example 4 includes the system of Example 3, wherein to automatically control the second subsystem to suppress the uncertainty in the one or more subsequent categorizations, the instructions, when executed, cause the automated control system to one or more of decrease a frequency of a control loop in the automated control system or decrease a resolution of a sensor in the second subsystem, and wherein the sensor is to be associated with the one or more subsequent categorizations.

Example 5 includes the system of Example 1, wherein to determine whether the corresponding uncertainty information satisfies the one or more relevance criteria, the instructions, when executed, cause the automated control system to take a plurality of samples from the categorization information and the corresponding uncertainty information, generate a plurality of actuation plans for the actuation subsystem based on the plurality of samples, and determine a safety deviation across the plurality of actuation plans, wherein the one or more relevance criteria are satisfied if the safety deviation exceeds a threshold.

Example 6 includes the system of any one of Examples 1 to 5, wherein the categorization information is to include a first candidate category of the object and a second candidate category of the object, wherein the corresponding uncertainty information is to include a first uncertainty value corresponding to the first candidate category, a second uncertainty value corresponding to the second candidate category, and an overall uncertainty value, wherein the first subsystem is an actuation subsystem, wherein the second subsystem is a perception subsystem, and wherein the environment is to be one or more of a co-mingled recycling environment, an industrial robot environment or an autonomous vehicle environment.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to obtain categorization information and corresponding uncertainty information from a subsystem, wherein the categorization information and the corresponding uncertainty information are to be associated with an object in an environment, determine whether the corresponding uncertainty information satisfies one or more relevance criteria, and automatically control the subsystem to increase an accuracy in one or more subsequent categorizations of the object if the corresponding uncertainty information satisfies the one or more relevance criteria.

Example 8 includes the apparatus of Example 7, wherein to automatically control the subsystem to increase the accuracy in the one or more subsequent categorizations, the logic coupled to the one or more substrates is to one or more of increase a frequency of a control loop in an automated control system or increase a resolution of a sensor in the subsystem, and wherein the sensor is to be associated with the one or more subsequent categorizations.

Example 9 includes the apparatus of Example 7, wherein the logic coupled to the one or more substrates is to automatically control the subsystem to suppress an uncertainty in the one or more subsequent categorizations if the corresponding uncertainty information does not satisfy the one or more relevance criteria.

Example 10 includes the apparatus of Example 9, wherein to automatically control the subsystem to suppress the uncertainty in the one or more subsequent categorizations, the logic coupled to the one or more substrates is to one or more of decrease a frequency of a control loop in an automated control system or decrease a resolution of a sensor in the subsystem, and wherein the sensor is to be associated with the one or more subsequent categorizations.

Example 11 includes the apparatus of Example 7, wherein to determine whether the corresponding uncertainty information satisfies the one or more relevance criteria, the logic coupled to the one or more substrates is to take a plurality of samples from the categorization information and the corresponding uncertainty information, generate a plurality of actuation plans based on the plurality of samples, and determine a safety deviation across the plurality of actuation plans, wherein the one or more relevance criteria are satisfied if the safety deviation exceeds a threshold.

Example 12 includes the apparatus of any one of Examples 7 to 11, wherein the categorization information is to include a first candidate category of the object and a second candidate category of the object, wherein the corresponding uncertainty information is to include a first uncertainty value corresponding to the first candidate category, a second uncertainty value corresponding to the second candidate category, and an overall uncertainty value, wherein the subsystem is to be a perception subsystem, and wherein the environment is to be one or more of a co-mingled recycling environment, an industrial robot environment or an autonomous vehicle environment.

Example 13 includes at least one computer readable storage medium comprising a set of executable program instructions, which when executed by an automated control system, cause the automated control system to obtain categorization information and corresponding uncertainty information from a subsystem, wherein the categorization information and the corresponding uncertainty information are to be associated with an object in an environment, determine whether the corresponding uncertainty information satisfies one or more relevance criteria, and automatically control the subsystem to increase an accuracy in one or more subsequent categorizations of the object if the corresponding uncertainty information satisfies the one or more relevance criteria.

Example 14 includes the at least one computer readable storage medium of Example 13, wherein to automatically control the subsystem to increase the accuracy in the one or more subsequent categorizations, the instructions, when executed, cause the automated control system to one or more of increase a frequency of a control loop in the automated control system or increase a resolution of a sensor in the subsystem, and wherein the sensor is to be associated with the one or more subsequent categorizations.

Example 15 includes the at least one computer readable storage medium of Example 13, wherein the instructions, when executed, further cause the automated control system to automatically control the subsystem to suppress an uncertainty in the one or more subsequent categorizations if the corresponding uncertainty information does not satisfy the one or more relevance criteria.

Example 16 includes the at least one computer readable storage medium of Example 15, wherein to automatically control the subsystem to suppress the uncertainty in the one or more subsequent categorizations, the instructions, when executed, cause the automated control system to one or more of decrease a frequency of a control loop in the automated control system or decrease a resolution of a sensor in the subsystem, and wherein the sensor is to be associated with the one or more subsequent categorizations.

Example 17 includes the at least one computer readable storage medium of Example 13, wherein to determine whether the corresponding uncertainty information satisfies the one or more relevance criteria, the instructions, when executed, cause the automated control system to take a plurality of samples from the categorization information and the corresponding uncertainty information, generate a plurality of actuation plans based on the plurality of samples, and determine a safety deviation across the plurality of actuation plans, wherein the one or more relevance criteria are satisfied if the safety deviation exceeds a threshold.

Example 18 includes the at least one computer readable storage medium of any one of Examples 13 to 17, wherein the categorization information is to include a first candidate category of the object and a second candidate category of the object, wherein the corresponding uncertainty information is to include a first uncertainty value corresponding to the first candidate category, a second uncertainty value corresponding to the second candidate category, and an overall uncertainty value, wherein the subsystem is to be a perception subsystem, and wherein the environment is to be one or more of a co-mingled recycling environment, an industrial robot environment or an autonomous vehicle environment.

Example 19 includes a method of operating a performance-enhanced computing system, the method comprising obtaining categorization information and corresponding uncertainty information from a subsystem, wherein the categorization information and the corresponding uncertainty information are associated with an object in an environment, determining whether the corresponding uncertainty information satisfies one or more relevance criteria, and automatically controlling the subsystem to increase an accuracy in one or more subsequent categorizations of the object if the corresponding uncertainty information satisfies the one or more relevance criteria.

Example 20 includes the method of Example 19, wherein automatically controlling the subsystem to increase the accuracy in the one or more subsequent categorizations includes one or more of increasing a frequency of a control loop in an automated control system or increasing a resolution of a sensor in the subsystem, and wherein the sensor is associated with the one or more subsequent categorizations.

Example 21 includes the method of Example 19, further including automatically controlling the subsystem to suppress an uncertainty in the one or more subsequent categorizations if the corresponding uncertainty information does not satisfy the one or more relevance criteria.

Example 22 includes the method of Example 21, wherein automatically controlling the subsystem to suppress the uncertainty in the one or more subsequent categorizations includes one or more of decreasing a frequency of a control loop in an automated control system or decreasing a resolution of a sensor in the subsystem, and wherein the sensor is associated with the one or more subsequent categorizations.

Example 23 includes the method of Example 19, wherein determining whether the corresponding uncertainty information satisfies the one or more relevance criteria includes taking a plurality of samples from the categorization information and the corresponding uncertainty information, generating a plurality of actuation plans based on the plurality of samples, and determining a safety deviation across the plurality of actuation plans, wherein the one or more relevance criteria are satisfied if the safety deviation exceeds a threshold.

Example 24 includes the method of any one of Examples 19 to 23, wherein the categorization information includes a first candidate category of the object and a second candidate category of the object, wherein the corresponding uncertainty information includes a first uncertainty value corresponding to the first candidate category, a second uncertainty value corresponding to the second candidate category, and an overall uncertainty value, wherein the subsystem is to be a perception subsystem, and wherein the environment is one or more of a co-mingled recycling environment, an industrial robot environment or an autonomous vehicle environment.

Example 25 includes means for performing the method of any one of Examples 19 to 24.

Thus, technology described herein increases the likelihood that a planning subsystem is able to meet the specified goals of the system. The technology also enables systems to operate in lower power-modes or use less energy overall, because the system may use the uncertainty signal to more finely regulate power to sensors by only operating at maximum capacity when ambiguity is high.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An automated control system comprising:
   a first subsystem;
   a second subsystem;
   a processor coupled to the first subsystem and the second subsystem; and
   a memory coupled to the processor, the memory including a set of executable program instructions, which when executed by the processor, cause the automated control system to:
      obtain categorization information and corresponding uncertainty information from the second subsystem, wherein the categorization information and the corresponding uncertainty information are associated with an object in an environment,
      determine whether the corresponding uncertainty information satisfies one or more relevance criteria, and
      automatically control the second subsystem to increase an accuracy in one or more subsequent categorizations of the object if the corresponding uncertainty information satisfies the one or more relevance criteria,
      wherein to determine whether the corresponding uncertainty information satisfies the one or more relevance criteria, the instructions, when executed, cause the automated control system to:
         take a plurality of samples from the categorization information and the corresponding uncertainty information,
         generate a plurality of actuation plans for the first subsystem based on the plurality of samples, and
         determine a safety deviation across the plurality of actuation plans, wherein the one or more relevance criteria are satisfied if the safety deviation exceeds a threshold.

2. The system of claim 1, wherein to automatically control the second subsystem to increase the accuracy in the one or more subsequent categorizations, the instructions, when executed, cause the automated control system to one or more of increase a frequency of a control loop in the automated control system or increase a resolution of a sensor in the second subsystem, and wherein the sensor is associated with the one or more subsequent categorizations.

3. The system of claim 1, wherein the instructions, when executed, further cause the automated control system to automatically control the second subsystem to suppress an uncertainty in the one or more subsequent categorizations if the corresponding uncertainty information does not satisfy the one or more relevance criteria.

4. The system of claim 3, wherein to automatically control the second subsystem to suppress the uncertainty in the one or more subsequent categorizations, the instructions, when executed, cause the automated control system to one or more of decrease a frequency of a control loop in the automated control system or decrease a resolution of a sensor in the second subsystem, and wherein the sensor is associated with the one or more subsequent categorizations.

5. The system of claim 1, wherein the plurality of actuation plans relate to movement of a second object in relation to the object in the environment.

6. The system of claim 1, wherein the categorization information includes a first candidate category of the object and a second candidate category of the object, wherein the corresponding uncertainty information includes a first uncertainty value corresponding to the first candidate category, a second uncertainty value corresponding to the second candidate category, and an overall uncertainty value, wherein the first subsystem is an actuation subsystem, wherein the second subsystem is a perception subsystem, and wherein the environment is one or more of a co-mingled recycling environment, an industrial robot environment or an autonomous vehicle environment.

7. A semiconductor apparatus comprising:
   one or more substrates; and
   logic coupled to the one or more substrates, wherein the logic is implemented at least partly in one or more of configurable logic or fixed-functionality hardware logic, the logic coupled to the one or more substrates to:
      obtain categorization information and corresponding uncertainty information from a subsystem, wherein the categorization information and the corresponding uncertainty information are associated with an object in an environment;
      determine whether the corresponding uncertainty information satisfies one or more relevance criteria; and
      automatically control the subsystem to increase an accuracy in one or more subsequent categorizations of the object if the corresponding uncertainty information satisfies the one or more relevance criteria,
      wherein to determine whether the corresponding uncertainty information satisfies the one or more relevance criteria, the logic is to:
         take a plurality of samples from the categorization information and the corresponding uncertainty information,
         generate a plurality of actuation plans based on the plurality of samples, and determine a safety deviation across the plurality of actuation plans, wherein the one or more relevance criteria are satisfied if the safety deviation exceeds a threshold.

8. The apparatus of claim 7, wherein to automatically control the subsystem to increase the accuracy in the one or more subsequent categorizations, the logic coupled to the one or more substrates is to one or more of increase a frequency of a control loop in an automated control system or increase a resolution of a sensor in the subsystem, and wherein the sensor is associated with the one or more subsequent categorizations.

9. The apparatus of claim 7, wherein the logic coupled to the one or more substrates is to automatically control the subsystem to suppress an uncertainty in the one or more subsequent categorizations if the corresponding uncertainty information does not satisfy the one or more relevance criteria.

10. The apparatus of claim 9, wherein to automatically control the subsystem to suppress the uncertainty in the one or more subsequent categorizations, the logic coupled to the one or more substrates is to one or more of decrease a frequency of a control loop in an automated control system or decrease a resolution of a sensor in the subsystem, and wherein the sensor is to be associated with the one or more subsequent categorizations.

11. The apparatus of claim 7, wherein the plurality of actuation plans relate to movement of a second object in relation to the object in the environment.

12. The apparatus of claim 7, wherein the categorization information includes a first candidate category of the object and a second candidate category of the object, wherein the corresponding uncertainty information includes a first uncertainty value corresponding to the first candidate category, a second uncertainty value corresponding to the second candidate category, and an overall uncertainty value, wherein the subsystem is a perception subsystem, and wherein the environment is one or more of a co-mingled recycling environment, an industrial robot environment or an autonomous vehicle environment.

13. At least one non-transitory computer readable storage medium comprising a set of executable program instructions, which when executed by an automated control system, cause the automated control system to:
obtain categorization information and corresponding uncertainty information from a subsystem, wherein the categorization information and the corresponding uncertainty information are associated with an object in an environment;
determine whether the corresponding uncertainty information satisfies one or more relevance criteria; and
automatically control the subsystem to increase an accuracy in one or more subsequent categorizations of the object if the corresponding uncertainty information satisfies the one or more relevance criteria,
wherein to determine whether the corresponding uncertainty information satisfies the one or more relevance criteria, the instructions, when executed, cause the automated control system to:
take a plurality of samples from the categorization information and the corresponding uncertainty information,
generate a plurality of actuation plans based on the plurality of samples, and
determine a safety deviation across the plurality of actuation plans, wherein the one or more relevance criteria are satisfied if the safety deviation exceeds a threshold.

14. The at least one non-transitory computer readable storage medium of claim 13, wherein to automatically control the subsystem to increase the accuracy in the one or more subsequent categorizations, the instructions, when executed, cause the automated control system to one or more of increase a frequency of a control loop in the automated control system or increase a resolution of a sensor in the subsystem, and wherein the sensor is associated with the one or more subsequent categorizations.

15. The at least one non-transitory computer readable storage medium of claim 13, wherein the instructions, when executed, further cause the automated control system to automatically control the subsystem to suppress an uncertainty in the one or more subsequent categorizations if the corresponding uncertainty information does not satisfy the one or more relevance criteria.

16. The at least one non-transitory computer readable storage medium of claim 15, wherein to automatically control the subsystem to suppress the uncertainty in the one or more subsequent categorizations, the instructions, when executed, cause the automated control system to one or more of decrease a frequency of a control loop in the automated control system or decrease a resolution of a sensor in the subsystem, and wherein the sensor is associated with the one or more subsequent categorizations.

17. The at least one non-transitory computer readable storage medium of claim 13, wherein the plurality of actuation plans relate to movement of a second object in relation to the object in the environment.

18. The at least one non-transitory computer readable storage medium of claim 13, wherein the categorization information includes a first candidate category of the object and a second candidate category of the object, wherein the corresponding uncertainty information includes a first uncertainty value corresponding to the first candidate category, a second uncertainty value corresponding to the second candidate category, and an overall uncertainty value, wherein the subsystem is a perception subsystem, and wherein the environment is one or more of a co-mingled recycling environment, an industrial robot environment or an autonomous vehicle environment.

19. A method comprising:
obtaining categorization information and corresponding uncertainty information from a subsystem, wherein the categorization information and the corresponding uncertainty information are associated with an object in an environment;
determining whether the corresponding uncertainty information satisfies one or more relevance criteria; and
automatically controlling the subsystem to increase an accuracy in one or more subsequent categorizations of the object if the corresponding uncertainty information satisfies the one or more relevance criteria,
wherein determining whether the corresponding uncertainty information satisfies the one or more relevance criteria comprises:
taking a plurality of samples from the categorization information and the corresponding uncertainty information,
generating a plurality of actuation plans for the first subsystem based on the plurality of samples, and determining a safety deviation across the plurality of actuation plans, wherein the one or more relevance criteria are satisfied if the safety deviation exceeds a threshold.

20. The method of claim 19, wherein automatically controlling the subsystem to increase the accuracy in the one or more subsequent categorizations includes one or more of increasing a frequency of a control loop in an automated control system or increasing a resolution of a sensor in the subsystem, and wherein the sensor is associated with the one or more subsequent categorizations.

21. The method of claim 19, further including automatically controlling the subsystem to suppress an uncertainty in the one or more subsequent categorizations if the corresponding uncertainty information does not satisfy the one or more relevance criteria.

22. The method of claim 21, wherein automatically controlling the subsystem to suppress the uncertainty in the one or more subsequent categorizations includes one or more of decreasing a frequency of a control loop in an automated control system or decreasing a resolution of a sensor in the subsystem, and wherein the sensor is associated with the one or more subsequent categorizations.

23. The method of claim 19, wherein the plurality of actuation plans relate to movement of a second object in relation to the object in the environment.

24. The method of claim 19, wherein the categorization information includes a first candidate category of the object and a second candidate category of the object, wherein the corresponding uncertainty information includes a first uncertainty value corresponding to the first candidate category, a second uncertainty value corresponding to the second candidate category, and an overall uncertainty value, wherein the subsystem is a perception subsystem, and wherein the environment is one or more of a co-mingled recycling environment, an industrial robot environment or an autonomous vehicle environment.

* * * * *

UNITED STATES PATENT AND TRADEMARK OFFICE
CERTIFICATE OF CORRECTION

PATENT NO. : 11,493,914 B2
APPLICATION NO. : 16/913845
DATED : November 8, 2022
INVENTOR(S) : Alvarez et al.

It is certified that error appears in the above-identified patent and that said Letters Patent is hereby corrected as shown below:

In the Claims

At Column 19, Line 26, cancel the text beginning with "10. The apparatus of claim 9" and insert the following claim:
--The apparatus of claim 9, wherein to automatically control the subsystem to suppress the uncertainty in the one or more subsequent categorizations, the logic coupled to the one or more substrates is to one or more of decrease a frequency of a control loop in an automated control system or decrease a resolution of a sensor in the subsystem, and wherein the sensor is associated with the one or more subsequent categorizations.--

Signed and Sealed this
Twenty-seventh Day of June, 2023

Katherine Kelly Vidal
*Director of the United States Patent and Trademark Office*